US012202269B2

(12) United States Patent
Ichinowatari et al.

(10) Patent No.: US 12,202,269 B2
(45) Date of Patent: Jan. 21, 2025

(54) LIQUID DISCHARGE APPARATUS

(71) Applicants: Jun Ichinowatari, Kanagawa (JP); Hiroyuki Yamashita, Kanagawa (JP)

(72) Inventors: Jun Ichinowatari, Kanagawa (JP); Hiroyuki Yamashita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 18/077,237

(22) Filed: Dec. 8, 2022

(65) Prior Publication Data

US 2023/0241892 A1 Aug. 3, 2023

(30) Foreign Application Priority Data

Jan. 31, 2022 (JP) ................................. 2022-013117

(51) Int. Cl.
*B41J 2/165* (2006.01)

(52) U.S. Cl.
CPC ................................. *B41J 2/16523* (2013.01)

(58) Field of Classification Search
CPC .... B41J 2/165; B41J 2/16505; B41J 2/16514; B41J 2/16517; B41J 2/1652; B41J 2/16523; B41J 2/16532; B41J 2/1721; B41J 2/17; B41J 2002/16594
See application file for complete search history.

(56) References Cited

U.S. PATENT DOCUMENTS

2009/0262171 A1 10/2009 Yamashita
2010/0171799 A1 7/2010 Takeuchi et al.
2011/0141167 A1 6/2011 Kikkawa et al.
2013/0050363 A1 2/2013 Usui et al.
2013/0093810 A1 4/2013 Suzuki et al.
2020/0047502 A1* 2/2020 Saito .................... B41J 2/16523
2022/0098776 A1 3/2022 Yamashita et al.
2022/0258476 A1 8/2022 Yamashita

FOREIGN PATENT DOCUMENTS

JP 2008-100405 5/2008
JP 2009-285982 12/2009
JP 2015-098134 5/2015
JP 2019-038124 3/2019
WO WO-2018096687 A1 * 5/2018 ............. B41J 2/165
WO WO-2019150803 A1 * 8/2019

OTHER PUBLICATIONS

Morimoto, Machine TranslationofWO-2019150803-A1 (Year: 2019).*
Takeda, Machine TranslationofWO-2018096687-A1 (Year: 2018).*

* cited by examiner

*Primary Examiner* — Scott A Richmond
(74) *Attorney, Agent, or Firm* — XSENSUS LLP

(57) ABSTRACT

A liquid discharge apparatus includes: a head including a nozzle from which a liquid is discharged; a cap configured to cover a nozzle surface having the nozzle; a first container configured to store a moisturizing liquid; a pump connected to the cap, the pump configured to generate a negative pressure in a space formed between the cap and the nozzle surface; a second container; and a waste liquid path connecting the cap and the second container, and the first container connected to the waste liquid path.

18 Claims, 3 Drawing Sheets

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-013117, filed on Jan. 31, 2022, in the Japan Patent Office, the entire disclosure of which is hereby incorporated by reference herein.

BACKGROUND

Technical Field

The present embodiment relates to a liquid discharge apparatus.

RELATED ART

In a liquid discharge head that discharges ink as liquid from a nozzle, there is a problem in which moisture of the ink in the nozzle evaporates and thickens when an image is not formed, so that the ink adheres to a nozzle wall surface to hinder discharge of the ink or change a discharging direction of the ink.

Thus, an opening end of the nozzle of the liquid discharge head is covered with a cap when an image is not formed to prevent drying of the ink in the nozzle. A suction pump sucks a space in the cap to remove the ink in the nozzle.

However, the ink in the nozzle sucked by the suction pump may adhere to the cap. There is a problem in which the adhered ink is dried in a state in which the cap is removed from a nozzle surface, so that the ink is accumulated in the cap. In particular, such disadvantage has been remarkable when ink having high drying property is used as the ink discharged by the liquid discharge head. In an embroidery machine that applies liquid to a thread; time for each job is long, so that the disadvantage of drying of the ink has been remarkable.

SUMMARY

In an aspect of the present disclosure, a liquid discharge apparatus includes: a head including a nozzle from which a liquid is discharged; a cap configured to cover a nozzle surface having the nozzle; a first container configured to store a moisturizing liquid; a pump connected to the cap, the pump configured to generate a negative pressure in a space formed between the cap and the nozzle surface; a second container; and a waste liquid path connecting the cap and the second container, and the first container connected to the waste liquid path.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
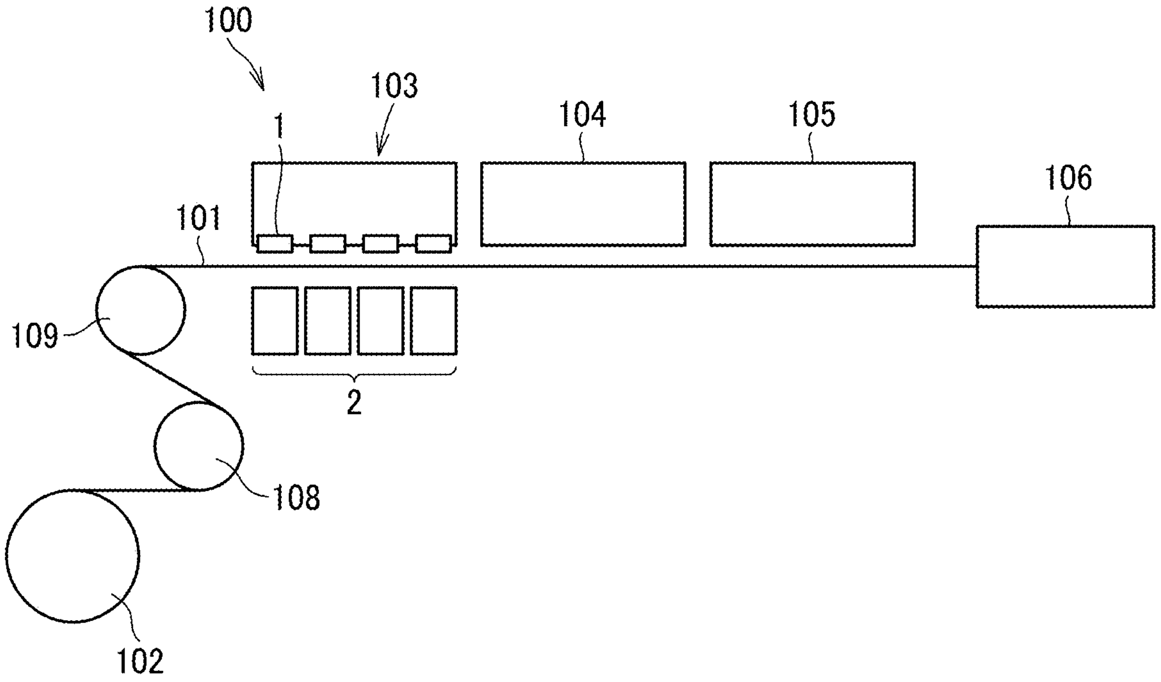
FIG. 1 is a schematic configuration view of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
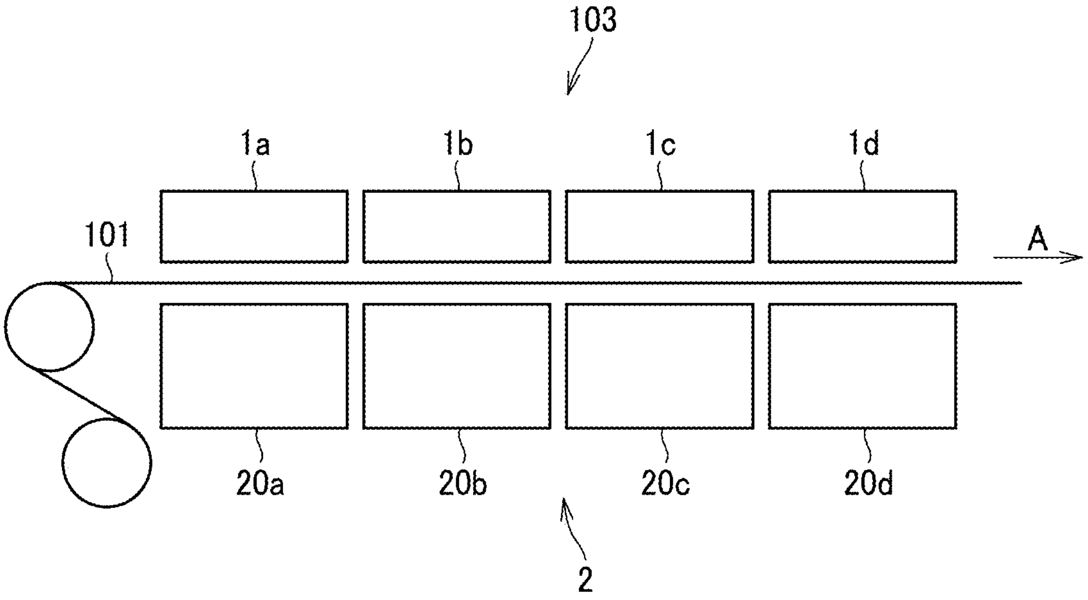
FIG. 2 is an explanatory view of a liquid application device of the liquid discharge apparatus.
Figure 3:
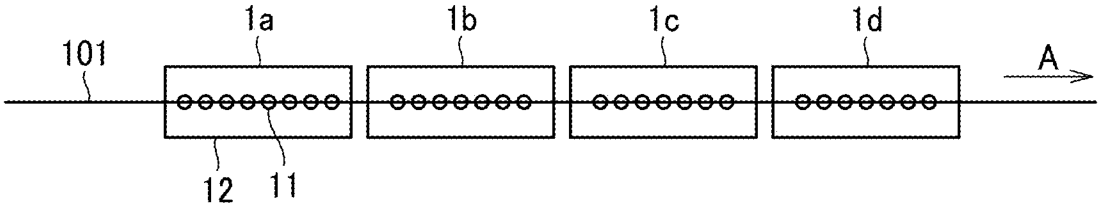
FIG. 3 is an explanatory view of a head array of the liquid application device as seen from below.

Referring now to the attached drawings, embodiments of the present disclosure are described below. An example of a liquid discharge apparatus according to the present embodiment is described referring to FIGS. 1 to 3. FIG. 1 is a schematic explanatory view of the liquid discharge apparatus, FIG. 2 is an explanatory view of a liquid application device of the liquid discharge apparatus, and FIG. 3 is an explanatory view of a head array of the liquid application device as seen from below.

A liquid discharge apparatus 100 is an in-line embroidery machine. The liquid discharge apparatus 100 includes a supply reel 102, a liquid application device 103, a fixing device 104, a post-processor 105, and an embroidery head 106. Around the supply reel 102, a thread 101 that is a target to which liquid is applied is wound.

The thread 101 pulled out from the supply reel 102 is guided by rollers 108 and 109 and continuously routed to the embroidery head 106.

The liquid application device 103 includes a plurality of liquid discharge heads 1 (1_a_ to 1_d_) as discharge units and a maintenance unit 2. The plurality of liquid discharge heads 1 discharges and applies liquid of a color to be used to the thread 101. The thread 101 is pulled out from the supply reel 102 to be conveyed. The maintenance unit 2 includes a plurality of individual maintenance units 20 (20_a_ to 20_d_) that performs maintenance of the liquid discharge heads 1, respectively. The liquid discharge heads 1_a_ to 1_d_ discharge liquids of colors of cyan (C), magenta (M), yellow (Y), and black (K), for example.

Here, as illustrated in FIG. 3, the liquid discharge head 1 includes a nozzle surface 12 provided with an opening end on a discharge side of a plurality of nozzles 11 that discharges liquid. The opening end on the discharge side of the nozzle 11 is the opening end on the side illustrated in FIG. 3. On the nozzle surface 12, a nozzle array in which the opening ends of the plurality of nozzles 11 is arrayed is formed. Each liquid discharge head 1 is arranged so that a direction of the nozzle array (array of the nozzles 11) is in a conveyance direction A of the thread 101.

The fixing device 104 performs a fixing process (drying process) on the thread 101 to which the liquid discharged from the liquid application device 103 is applied. The fixing device 104 includes, for example, a heater such as an infrared irradiator and a hot air sprayer to heat and dry the thread 101.

The post-processor 105 includes, for example, a cleaning device that cleans the thread 101, a tension adjustment device that adjusts a tension of the thread 101, a feed amount detector that detects an amount of movement of the thread 101, and a lubricant application device that lubricates a surface of the thread 101.

The embroidery head 106 embroiders cloth with a pattern, for example, using the thread 101.

In the present embodiment, an example in which the liquid discharge apparatus is the embroidery machine is described, but the apparatus is not limited to this, and the present embodiment may also be applied to an apparatus that uses a linear member such as a thread, for example, an apparatus such as a loom and a sewing machine, or an apparatus that prints an image on a general sheet material. The present embodiment may be applied not only to apparatuses having a post-process such as an embroidery machine, but also to dyeing apparatuses and the like that dye and wind threads and the like as described below.

The "thread" is a glass fiber thread, a wool thread, a cotton thread, a synthetic thread, a metal thread, a mixed thread of wool, cotton, polymer, or metal, a yarn, a filament, or a linear member (continuous base material) to which liquid may be applied, and also includes a braid, a flat braid and the like.

Figure 4:
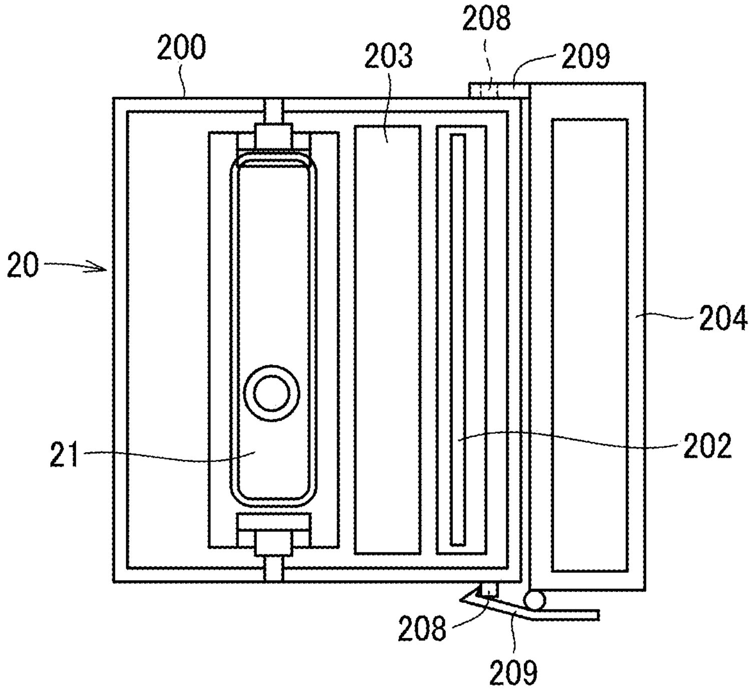
FIG. 4 is a planar explanatory view of an individual maintenance unit according to an embodiment of the present disclosure.

Here, an example of the individual maintenance unit forming the maintenance unit is described referring to FIG. 4. FIG. 4 is a schematic planar explanatory view of the individual maintenance unit.

In the individual maintenance unit 20, a cap 21, a wiper member 202, and a dummy discharge receiver 203 when performing dummy discharge are arranged in a housing 200. The cap 21 abuts the nozzle surface 12 of the liquid discharge head 1 and covers the opening end on the discharge side of the nozzle 11. The wiper member 202 wipes the nozzle surface 12.

To an outer side surface of the housing 200 of the individual maintenance unit 20, a discharge receiver 204 is detachably attached. The discharge receiver 204 is attachable to and detachable from the housing 200 by, for example, a lock 209 fitted to a protrusion 208 of the housing 200.

In this manner, by detachably attaching the discharge receiver 204 to the individual maintenance unit 20, it is possible to easily replace only the discharge receiver 204 in a case where the discharge receiver 204 is full.

The wiping of the nozzle surface 12 by the wiper member 202 or the dummy discharge to the discharge receiver 204 may suppress drying of ink adhered in the cap 21.

Figure 5:
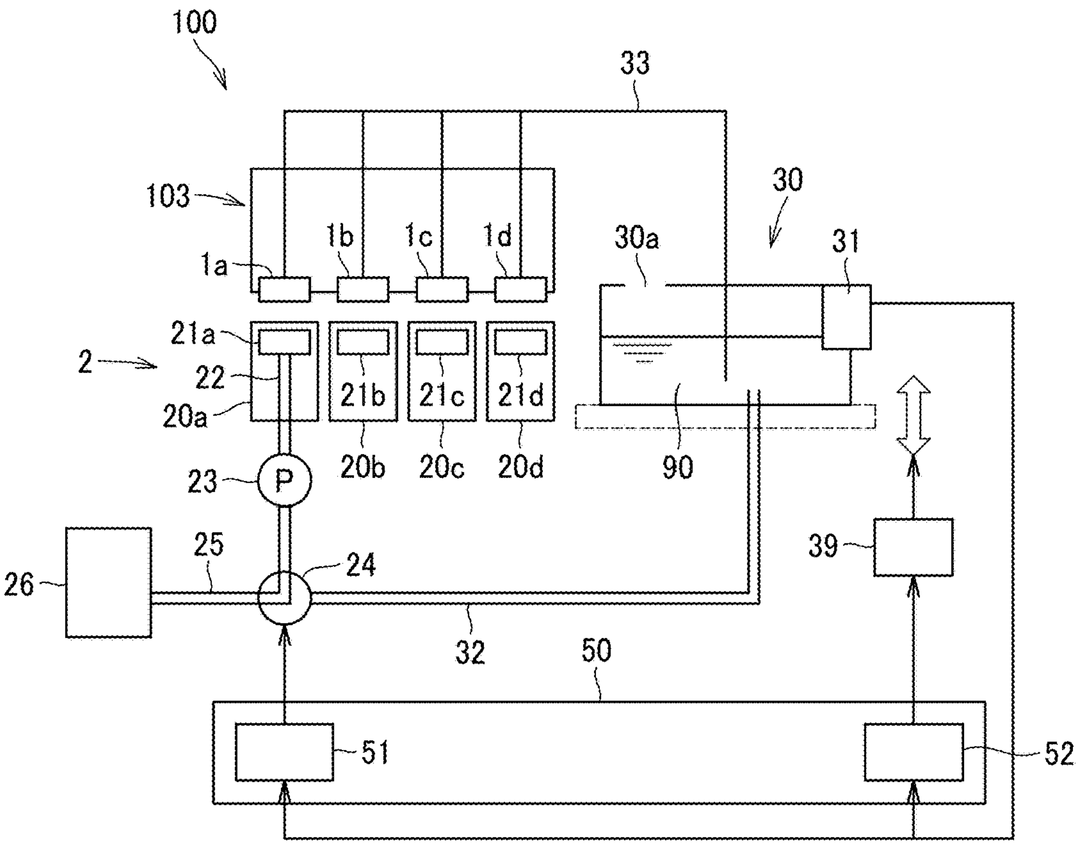
FIG. 5 is an explanatory view of the individual maintenance unit.

Next, a first embodiment of the present disclosure is described referring to FIG. 5. FIG. 5 is an explanatory view of a maintenance unit portion according to this embodiment.

Individual maintenance units 20 (20*a* to 20*d*) of a maintenance unit 2 include a plurality of caps 21 (21*a* to 21*d*) arranged so as to abut (be capped to) and separate (be decapped) from liquid discharge heads 1*a* to 1*d*, respectively.

Here, to the cap 21*a*, an individual discharge path 22 is connected. The individual discharge path 22 is provided with a suction pump 23 as a suction member. The cap 21 is connected to the suction pump 23 via the individual discharge path 22. Although only the individual discharge path 22 and the suction pump 23 connected to the cap 21*a* are illustrated in FIG. 5, the individual discharge path 22 provided with the suction pump 23 is similarly connected to other caps 21*b* to 21*d*.

The individual discharge path 22 connected to the cap 21*a* is connected to a common discharge path 25 via a switching valve 24. The common discharge path 25 is connected to a waste liquid container 26 at one end side thereof. The waste liquid container 26 is made of a container in a substantially sealed state. The individual discharge path 22 and the common discharge path 25 form a waste liquid path that connects the cap 21*a* to the waste liquid container 26. The waste liquid container 26 is an example of a second container. The switching valve 24 may also be referred to as a "switch".

Each individual discharge path 22 is provided with the suction pump 23 as a suction member, and each cap 21 is connected to the suction pump 23 via the individual discharge path 22.

Here, the suction pump 23 is made of a tubing pump, and the individual discharge path 22 is made of a tube of the suction pump 23. The suction pump 23 performs a suction operation in which a pressing roller squeezes the tube when rotating in a first direction to suck the inside of the cap 21. When the suction pump 23 allows the pressing roller to rotate in a second direction opposite to the first direction, this is separated from the tube, and the individual discharge path 22 is put into a communication state between an upstream side and a downstream side of the suction pump 23.

The liquid discharge apparatus 100 includes a moisturizing liquid container 30. The moisturizing liquid container 30 stores a moisturizing liquid 90. The moisturizing liquid container 30 includes a standby communication port 30*a*. The moisturizing liquid container is provided with a remaining amount detection mechanism 31. The remaining amount detection mechanism 31 detects a liquid level of the moisturizing liquid 90 in the moisturizing liquid container 30. The moisturizing liquid container 30 is an example of a first container.

To the moisturizing liquid container 30, a moisturizing liquid supply path 32 is connected. The moisturizing liquid supply path 32 is connected to the common discharge path 25 via the switching valve 24 at an end on a side opposite to a side connected to the moisturizing liquid container 30. That is, the moisturizing liquid container 30 is connected to the waste liquid path via the moisturizing liquid supply path 32. Although omitted in FIG. 5, the moisturizing liquid supply path 32 is connected to the individual discharge paths 22 connected to the caps 21*b* to 21*d* via the switching valves 24, respectively.

To the moisturizing liquid container 30, a head-side moisturizing liquid supply path 33 is connected. The head-side moisturizing liquid supply path 33 is connected to each of the liquid discharge heads 1*a* to 1*d*.

The liquid discharge apparatus 100 includes a controller 50. The controller 50 includes a switching valve controller Si and a vertical movement controller 52. The switching valve controller 51 controls switching of each switching valve 24.

The vertical movement controller 52 controls drive of a moving mechanism 39 that moves the moisturizing liquid container 30 up and down. The moving mechanism 39 is an example of an elevator to vertically move the moisturizing liquid container 30 (first container).

A detection result by the remaining amount detection mechanism 31 is input to the switching valve controller 51 and the vertical movement controller 52, Based on the detection result by the remaining amount detection mechanism 31, the vertical movement controller 52 moves the moisturizing liquid container 30 up and down so that the liquid level in the moisturizing liquid container 30 is the same as the height of the cap 21 (that is, a position overlapping any portion of the cap 21). The switching valve controller 51 switches the switching valve 24 to allow the moisturizing liquid supply path 32 to communicate with the individual discharge path 22. As a result, the moisturizing liquid 90 may be supplied from the moisturizing liquid container 30 to the cap 21*a* via the moisturizing liquid supply path 32 and the individual discharge path 22. That is, the moisturizing liquid 90 may be supplied to the cap 21*a* without intervention of the liquid discharge head 1*a*. As for the caps 21*b* to 21*d*, similarly, the moisturizing liquid 90 in the moisturizing liquid container 30 may be supplied to each of the caps 21*b* to 21*d* by switching the corresponding switching valve 24 and connecting the moisturizing liquid supply path 32 to each individual discharge path 22. The height such as the liquid level herein refers to a position in a direction of gravity and an opposite direction in a state in which the liquid discharge apparatus 100 is placed on a horizontal plane.

As described above, in the present embodiment, the moisturizing liquid 90 in the moisturizing liquid container 30 may be directly supplied to the cap 21 without intervention of the liquid discharge head 1. Therefore, the inside of the cap 21 may be efficiently moisturized, and accumulation of dried ink in the cap 21 may be suppressed. Without intervention of the liquid discharge head 1, the path for supplying the moisturizing liquid 90 to the cap 21 may be shortened, and a consumed amount of the moisturizing liquid 90 may be reduced.

In particular, in the apparatus that discharges the liquid to the thread as in the liquid discharge apparatus 100 of the present embodiment, time for each job tends to be long, and the ink in the cap is easily dried. Therefore, it is preferable to apply a configuration of supplying the moisturizing liquid of the present embodiment.

By making the liquid level in the moisturizing liquid container 30 the same as the height of the cap 21, the amount of the moisturizing liquid 90 with which the cap 21 is filled may be kept constant. When the apparatus is stopped also, the cap 21 may be filled with the moisturizing liquid 90.

The ink and the moisturizing liquid 90 discharged from the liquid discharge head 1 are stored in the waste liquid container 26 via each individual discharge path 22 and the common discharge path 25. The waste liquid container 26 is detachably attached to the liquid discharge apparatus 100 and is periodically replaced by a user and the like.

In place of providing the remaining amount detection mechanism 31, by forming the moisturizing liquid container 30 of a transparent material, it is possible to visually confirm the liquid level in the moisturizing liquid container 30 to move the moisturizing liquid container up and down. The moisturizing liquid container 30 and the switching valve 24 may be manually moved up and down.

The moisturizing liquid 90 may be supplied to the cap 21 via the head-side moisturizing liquid supply path 33.

Figure 6:
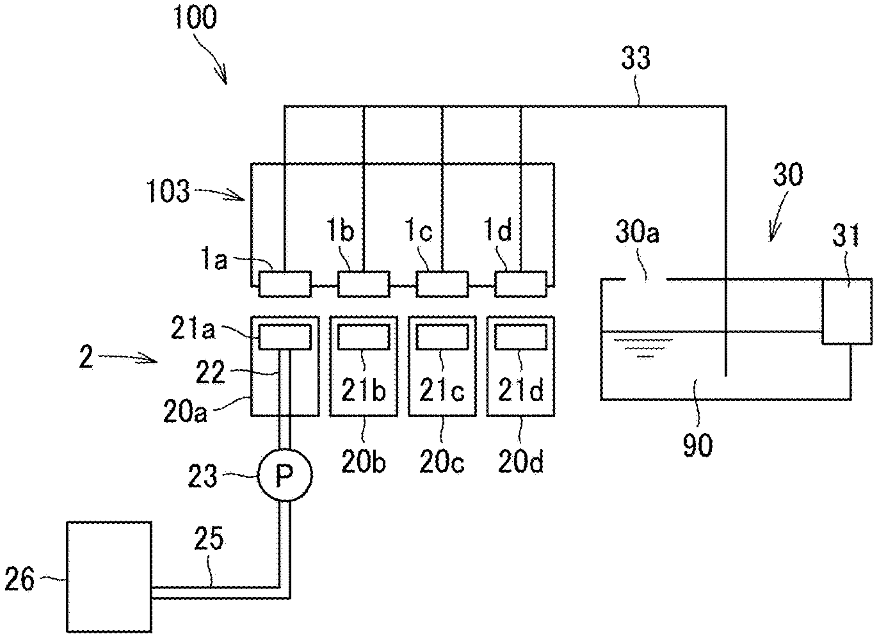
FIG. 6 is an explanatory view illustrating another example of the individual maintenance unit.

As an example, in the liquid discharge apparatus 100 according to an embodiment illustrated in FIG. 6, only the head-side moisturizing liquid supply path 33 is provided as path for supplying the moisturizing liquid 90 in the moisturizing liquid container 30 to the cap 21.

In the present embodiment, according to the detection result by the remaining amount detection mechanism 31, the liquid level in the moisturizing liquid container 30 is arranged below the nozzle surface provided on the liquid discharge head 1 in the direction of gravity.

When suction of the head is performed by the suction pump 23, the moisturizing liquid 90 in the moisturizing liquid container 30 may be supplied to each cap 21 via the head-side moisturizing liquid supply path 33 and the nozzle of the liquid discharge head 1.

Although the embodiments of the present disclosure have been described above, the present embodiment is not limited to the embodiments described above, and a variety of modifications may naturally be made within the scope of the present embodiment.

In the present application, a "liquid discharge apparatus" is an apparatus including a liquid discharge head and drives the liquid discharge head to discharge liquid. The "liquid discharge apparatus" includes, in addition to apparatuses that may discharge liquid to materials to which liquid may adhere, apparatuses that discharge the liquid into gas (air) or liquid.

The "liquid discharge apparatus" may include devices to feed, convey, and eject the material to which liquid may adhere, and a pre-processing apparatus and a post-processing apparatus.

The "liquid discharge apparatus" may be, for example, an image forming apparatus that forms an image on a paper sheet by discharging ink, or a stereoscopic fabrication apparatus (three-dimensional fabrication apparatus) that discharges a fabrication liquid to a powder layer obtained by forming powder materials into layers for fabricating a stereoscopic fabrication object (three-dimensional fabrication object).

The "liquid discharge apparatus" is not limited to an apparatus that visualizes meaningful images such as letters or figures by discharged liquid. For example, the liquid discharge apparatus may be an apparatus that forms a meaningless pattern and the like, and an apparatus that fabricates a three-dimensional image.

The "material to which the liquid may adhere" is the above-described target to which the liquid is applied, and means a material to which the liquid may at least temporarily adhere, a material to which the liquid adheres to be fixed, a material to which the liquid adheres to permeate and the like. Specific examples thereof include recording media such as paper sheet, recording paper, recording sheet of paper, film, and cloth, electronic component such as electronic substrate and piezoelectric element, and media such as powder layer, organ model, and testing cell, and includes any material to which liquid adheres, unless particularly limited.

Examples of the "material to which liquid may adhere" include any material to which liquid may adhere even temporarily, such as paper, thread, fiber, fabric, leather, metal, plastic, glass, wood, and ceramic.

The "liquid discharge apparatus" may be an apparatus that moves the liquid discharge head relative to a material to which liquid may adhere. However, the liquid discharge apparatus is not limited to such apparatus. A specific example thereof includes a serial head apparatus that moves the liquid discharge head or a line head apparatus that does not move the head.

Examples of the "liquid discharge apparatus" further include a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The terms "image formation", "recording", "printing", "image printing", and "fabricating" used herein may be used synonymously with each other. In the present embodiment, the moisturizing liquid may be supplied to the cap via the waste liquid path.

[Aspect 1]

A liquid discharge apparatus includes: a head including a nozzle from which a liquid is discharged; a cap configured to cover a nozzle surface having the nozzle; a first container configured to store a moisturizing liquid; a pump connected to the cap, the pump configured to generate a negative pressure in a space formed between the cap and the nozzle surface; a second container; and a waste liquid path connecting the cap and the second container, and the first container connected to the waste liquid path.

[Aspect 2]

The liquid discharge apparatus according to aspect 1, further includes: a switch configured to switch between a first path connecting the cap and the first container and a second path connecting the cap and a second container; and a pump configured to supply the moisturizing liquid from the first container to the cap through the first path or discharge the liquid from the cap to the second container through the second path.

[Aspect 3]

The liquid discharge apparatus according to aspect 1, further includes an elevator configured to vertically move the first container to cause a liquid level of the moisturizing liquid in the first container to the same level as the cap.

[Aspect 4]

The liquid discharge apparatus according to aspect 3, further includes: a detector configured to detect a liquid level of the moisturizing liquid in the first container; and an elevator vertically moves the first container based on a detection of the detector.

[Aspect 5]

The liquid discharge apparatus according to aspect 1, further includes: a third path connecting the first container and the head, and the moisturizing liquid is supplied from the first container to the nozzle of the head.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a head including a nozzle from which a liquid is discharged;

a cap configured to cover a nozzle surface having the nozzle;

a first container configured to store a moisturizing liquid;

a pump connected to the cap, the pump configured to generate a negative pressure in a space formed between the cap and the nozzle surface;

a second container;

a waste liquid path connecting the cap and the second container; and a switch configured to switch between a first path connecting the cap and the first container and a second path connecting the cap and the second container, wherein the pump is configured to supply the moisturizing liquid from the first container to the cap through the first path or discharge the liquid from the cap to the second container through the second path, the first container is connected to the waste liquid path.

2. The liquid discharge apparatus according to claim 1, further comprising an elevator configured to vertically move the first container to cause a liquid level of the moisturizing liquid in the first container to be the same level as the cap.

3. The liquid discharge apparatus according to claim 2, further comprising:

a detector configured to detect a liquid level of the moisturizing liquid in the first container, wherein the elevator vertically moves the first container based on a detection of the detector.

4. The liquid discharge apparatus according to claim 2, further comprising:

a detector configured to detect a liquid level of the moisturizing liquid in the first container; and a controller configured to cause the elevator to vertically move the first container based on a detection of the detector.

5. The liquid discharge apparatus according to claim 1, further comprising:

a third path connecting the first container and the head, wherein the moisturizing liquid is supplied from the first container to the nozzle of the head.

6. The liquid discharge apparatus according to claim 1, further comprising a controller configured to control the switch to switch between the first path and the second path.

7. A liquid discharge apparatus comprising:

a head including a nozzle from which a liquid is discharged;

a cap configured to cover a nozzle surface having the nozzle;

a first container configured to store a moisturizing liquid;

a pump connected to the cap, the pump configured to generate a negative pressure in a space formed between the cap and the nozzle surface;

a second container;

a waste liquid path connecting the cap and the second container; and an elevator configured to vertically move the first container to cause a liquid level of the moisturizing liquid in the first container to be the same level as the cap, wherein the first container is connected to the waste liquid path.

8. The liquid discharge apparatus according to claim 7, further comprising:

a switch configured to switch between a first path connecting the cap and the first container and a second path connecting the cap and the second container, wherein the pump is configured to supply the moisturizing liquid from the first container to the cap through the first path or discharge the liquid from the cap to the second container through the second path.

9. The liquid discharge apparatus according to claim 8, further comprising a controller configured to control the switch to switch between the first path and the second path.

10. The liquid discharge apparatus according to claim 7, further comprising:

a detector configured to detect a liquid level of the moisturizing liquid in the first container, wherein the elevator vertically moves the first container based on a detection of the detector.

11. The liquid discharge apparatus according to claim 7, further comprising:

a detector configured to detect a liquid level of the moisturizing liquid in the first container; and a controller configured to cause the elevator to vertically move the first container based on a detection of the detector.

12. The liquid discharge apparatus according to claim 7, further comprising:

a third path connecting the first container and the head, wherein the moisturizing liquid is supplied from the first container to the nozzle of the head.

13. A liquid discharge apparatus comprising:

a bead including a nozzle from which a liquid is discharged;

a cap configured to cover a nozzle surface having the nozzle;

a first container configured to store a moisturizing liquid;

a pump connected to the cap, the pump configured to generate a negative pressure in a space formed between the cap and the nozzle surface;

a second container;

a waste liquid path connecting the cap and the second container; and a third path connecting the first container and the head, wherein the first container is connected to the waste liquid path, and the moisturizing liquid is supplied from the first container to the nozzle of the head.

14. The liquid discharge apparatus according to claim 13, further comprising:

a switch configured to switch between a first path connecting the cap and the first container and a second path connecting the cap and the second container, wherein the pump is configured to supply the moisturizing liquid from the first container to the cap through the first path or discharge the liquid from the cap to the second container through the second path.

15. The liquid discharge apparatus according to claim 14, further comprising a controller configured to control the switch to switch between the first path and the second path.

16. The liquid discharge apparatus according to claim 13, further comprising an elevator configured to vertically move the first container to cause a liquid level of the moisturizing liquid in the first container to the be same level as the cap.

17. The liquid discharge apparatus according to claim 16, further comprising:

a detector configured to detect a liquid level of the moisturizing liquid in the first container, wherein the elevator vertically moves the first container based on a detection of the detector.

18. The liquid discharge apparatus according to claim 16, further comprising:

a detector configured to detect a liquid level of the moisturizing liquid in the first container; and a controller configured to cause the elevator to vertically move the first container based on a detection of the detector.

* * * * *